Patented June 18, 1946

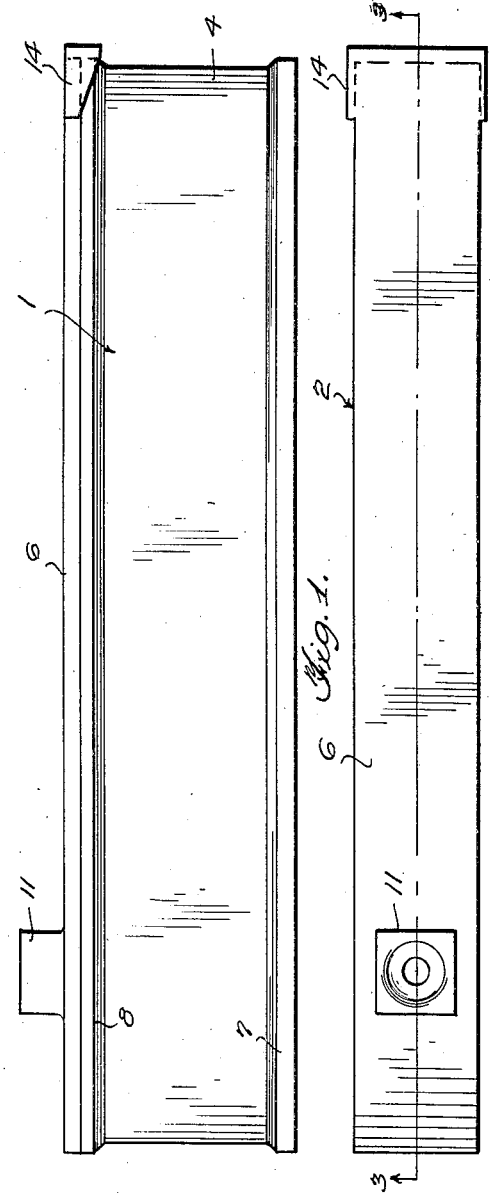
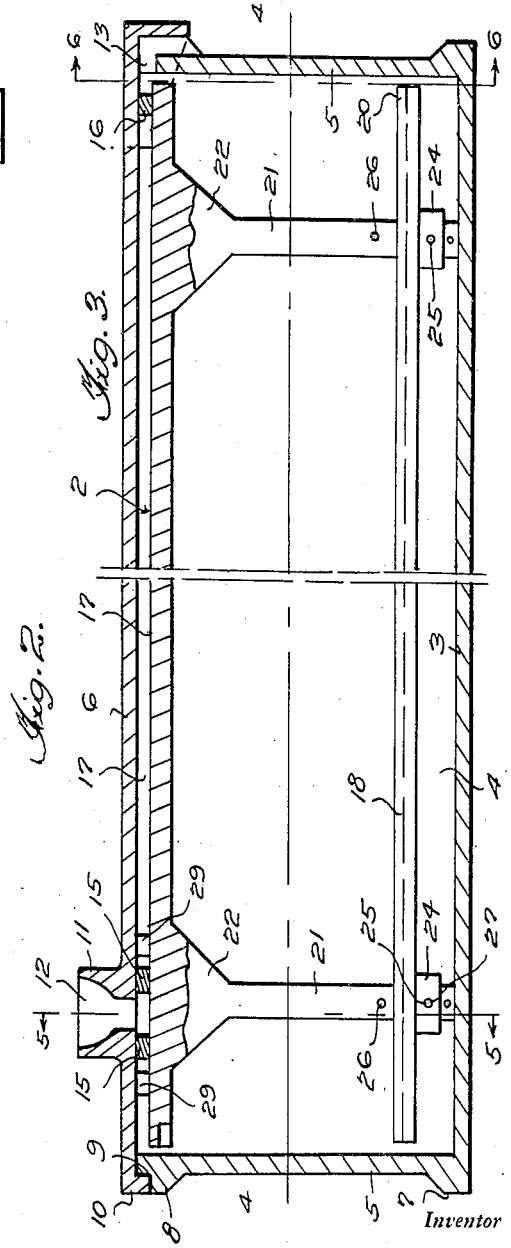
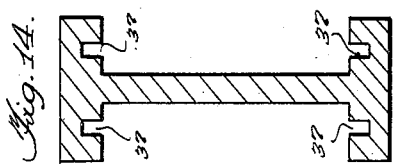
Inventor
ANTHONY M. JANKOSKI,
By Clarence A. O'Brien
and Harvey B. Jacobson
Attorneys

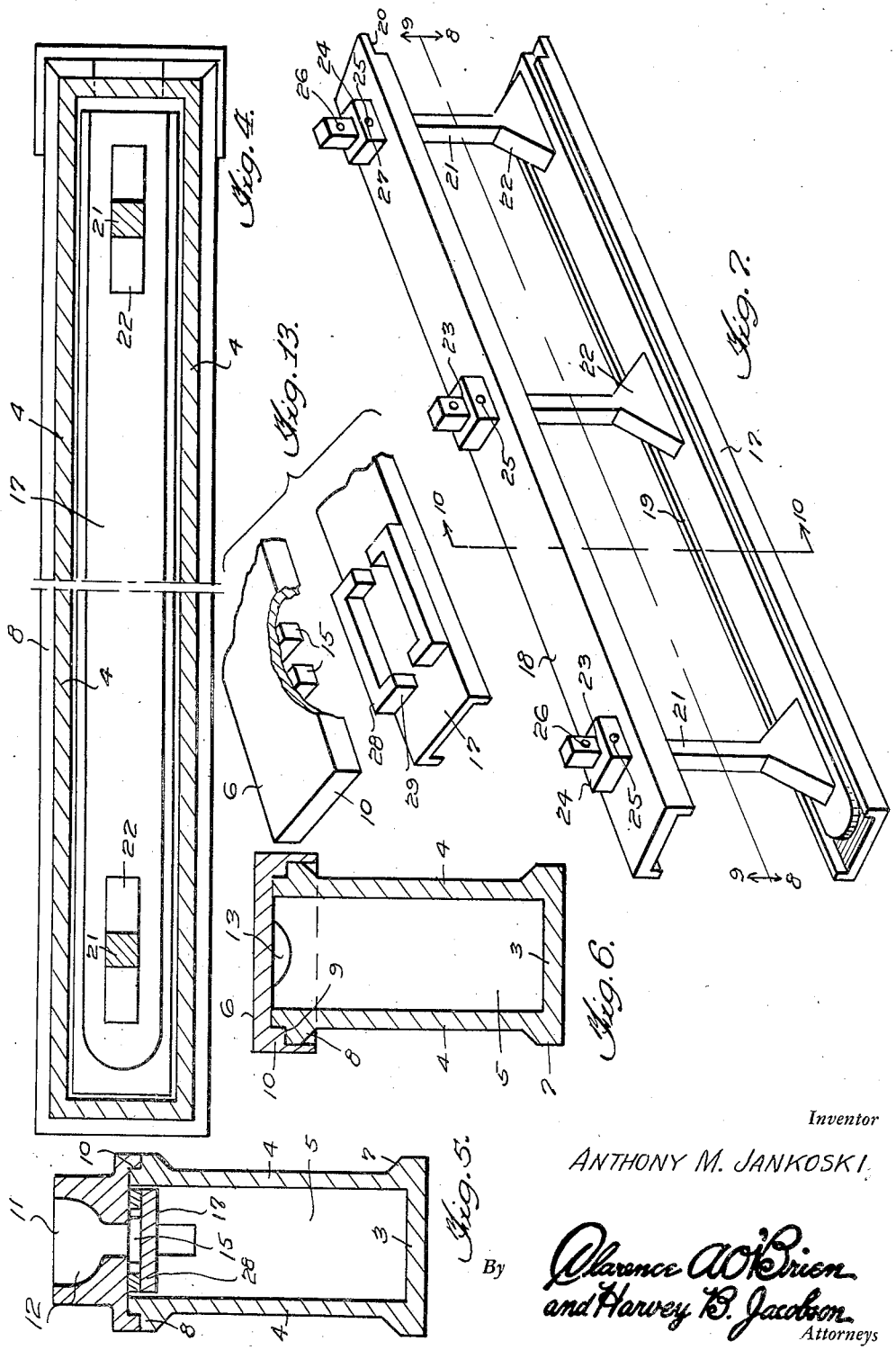

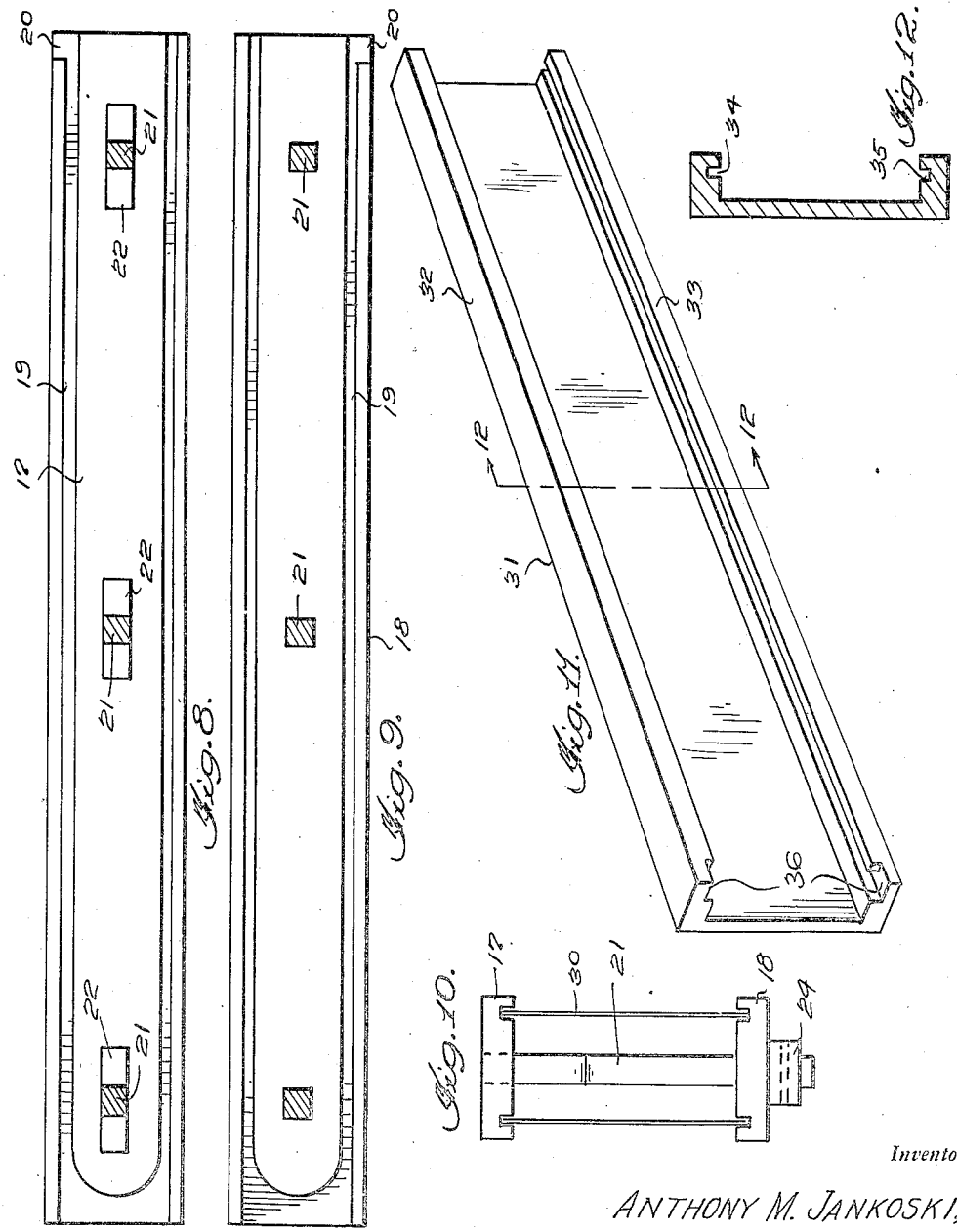

2,402,250

UNITED STATES PATENT OFFICE 2,402,250

FILM DEVELOPING APPARATUS

Anthony M. Jankoski, Stanley, Wis.

Application September 5, 1944, Serial No. 552,734

2 Claims. (Cl. 95—90.5)

My invention relates to improvements in film developing apparatus, the primary object in view being to provide simply constructed, inexpensive means for use in developing roll film in a dark room, and which is especially designed for quick loading with roll film of different sizes, in substantially total darkness, without injuring such film.

Other and subordinate objects are also comprehended by my invention, all of which, together with the precise nature of my improvements, will be readily understood when the succeeding description and claims are read with reference to the drawings accompanying and forming part of this specification.

In said drawings:

Figure 1 is a view in side elevation of my improved film developing apparatus, in a preferred embodiment thereof, Figure 2 is a view in plan, Figure 3 is a view in vertical longitudinal section taken on the line 3—3 of Figure 2 and drawn to an enlarged scale, Figure 4 is a view in horizontal section taken on the line 4—4 of Figure 3, Figure 5 is a view in transverse section taken on the line 5—5 of Figure 3, Figure 6 is a similar view taken on the line 6—6 of Figure 3, Figure 7 is a view in perspective of the film holder inverted, Figure 8 is a view in horizontal section taken on the line 8—8 of Figure 7, Figure 9 is a similar view taken on the line 9—9 of Figure 7, Figure 10 is a view in transverse section taken on the line 10—10 of Figure 7, Figure 11 is a view in perspective of a modified embodiment of film holder, Figure 12 is a view in transverse section taken on the line 12—12 of Figure 11 and drawn to an enlarged scale, Figure 13 is a detail view in perspective of the cover and holder illustrating the light baffle devices beneath the filler neck, Figure 14 is a view in transverse section illustrating another modified embodiment of holder.

Referring to the drawings by numerals, and first to Figures 1 to 10 and 13, my invention, in the preferred embodiment thereof, comprises a tank 1 for containing a developing liquid, and a film holder designated as a unit by the numeral 2, both of which will now be described in detail.

The tank 1 is of elongated, rectangular form and includes a bottom 3, sides 4, ends 5, and a removable cover panel 6. Reinforcing beads 7, 8 extend around the lower and upper edges of the tank, and the upper edge of said tank is provided with an external rabbet or groove 9 therein for seating a bottom edge flange 10 extending around the cover panel 6. Adjacent one end of the tank 1 and cover panel 6, said panel is provided with a filler neck 11 having a funnel-shaped opening 12 therein. The opposite end of the tank 1 is provided in the upper edge thereof with a liquid overflow, or pouring, notch 13 therein, and the flange 10 of the cover panel 6 is deepened at the corresponding end of the cover panel 6 to extend well down below said notch 13 to exclude light therefrom. Side cheek members 14 at said end of the cover panel 6 further prevents the light from entering said notch 13. A pair of transverse cleats 15 are provided on the bottom side of the cover panel 6 at opposite sides of the opening 12, respectively, and a single, similar cleat 16 adjacent to the opposite end of said cover panel 6 and directly opposite the notch 13. The function of the cleats 15, 16 will presently appear.

The holder 2 comprises a pair of opposed top and bottom film holder bars 17, 18 of elongated, rectangular form and of requisite size to fit in the tank 1 with sufficient clearance for easy removal of the same without binding. The opposed faces of the bars 17, 18 are rabbeted to provide a groove 19 therein extending along the side edges of the same from one end thereof and across the other end of the bars, the grooves 19 being designed to receive the edges of a roll film therein inserted as presently described in the holder from the first-mentioned end of the bars 17, 18 constituting the loading end of the holder. At said loading end of the holder 1, the grooves 19 on one side of said holder terminate in lateral ends 20 facilitating entering one end of a film laterally into the grooves 19 in a manner which will presently be clear. A series of posts 21 of square cross section with flaring heads 22 are suitably attached to the top bars 17 in the longitudinal center thereof, one adjacent to each end of said bar and the other in the transverse center of the bar, and which are slidably extended through similarly shaped sockets 23 extending through the bottom bar 18 and through square reinforcing bosses 24 suitably fixed on the bottom face of said bottom bar 18. The bosses 24 are each provided with a transverse aperture 25 therein extending from side to side thereof and the posts 21 are each provided with a series of longitudinally spaced similar apertures 26 therein. Pins 27 are provided for insertion through the apertures 25, 26 to vary the height of the support 1 for films of different widths. The top bar 17 is provided adjacent one end thereof with a pair of opposed, spaced-apart, angular cleats 28 extending along opposite sides of the bar and having inwardly extending ends 29. The cleats 28 are adapted to partially surround the pair of cleats 15 and form therewith light excluding baffle means preventing light from entering the tank through the opening 12 when the cover panel 6 is in place. The cleats 16 before mentioned are designed to coact with the top bar 17 to function similarly as regards preventing light from entering the tank 1 through the notch 13. The cleats 15, 16 and 28 also act as splash guards preventing liquid from escaping from the tank 1 through the opening 12 and the notch 13 in handling of the apparatus. The described posts 21 are designed to rest on the bottom of the tank 1 and support the top bar 17 of the holder 2 at a level for engagement of the cleats 28 by the cover panel 6 and engagement of the cleats 15, 16 by the top bar 17.

The manner in which the described invention is designed to be used and operated will be readily understood. The holder 2 having been adjusted, as regards the bars 17, 18, in the manner already described, to accommodate in the grooves 19 a roll film of the width which it is desired to develop, the film is loaded into the holder 2 by entering one end laterally into the ends 20 of the grooves 19, then pulling said end of the film along the groove 19. As will be seen, under such pull on said end the holder becomes self-loading. It will, of course, be understood that the holder 2, likewise the tank 1, is designed as regards the length for the development of roll films of maximum length. With the film loaded into the holder 2 in the manner described and illustrated at 30 in Figure 10, the holder and film are next inserted in the tank 1 and the cover panels 6 applied to close said tank. The developer liquid may then be poured into the tank 1 through the neck 11, until overflow through notch 13 advises that said tank is full. The manner in which the film 30 is unloaded will be manifest from the description of the way in which it is loaded into the holder. As has been previously explained, the posts 21 are designed to seat on the bottom 3 of the tank 1. Therefore, regardless of the adjustment of the bars 17, 18, the top bar 17 is always spaced from the cover panel 6 in the manner previously described for proper functioning of the cleats 15, 16, 28 in the manner already set forth.

As shown in Figures 11 and 12, my invention comprehends a modified embodiment of holder 31 which has the form of a channel member embodying a pair of opposed top and bottom longitudinal edge flanges 32, 33 provided in the opposed faces thereof with upper and lower longitudinal grooves 34, 35 which, at one end of the holder 31, open laterally, as at 36, onto the side edges of the flanges 32, 33. This form of holder 31 is designed for use with short length films of uniform width which are inserted into the grooves 34, 35 by way of the laterally opening ends 36 in a manner which will be readily apparent from the description of the preferred embodiment of the invention.

In the modified embodiment of holder shown in Figure 14, the arrangement is the same as described with reference to Figures 11 and 12, with the exception that the holder is of duplex form with film holding grooves 37 arranged in complemental pairs at opposite sides of the holder. This form of holder may be used to support a double load of short length films, as will be clear.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. In apparatus for use in developing roll film, a developing tank having an overflow recess therein, a cover panel having a filling neck therein, a film holder removably fitted in said tank, and coacting baffle devices on said cover panel and holder for obstructing the entrance of light into the tank by way of said neck and recess, respectively, constructed and arranged to act as splash guards preventing the escape of developer from the tank out of said neck and recess, said holder including a top bar spaced from said panel, said devices comprising cleats on said bar, and cleats on said panel.

2. In apparatus for developing roll films, an elongated rectangular developer tank, a cover panel fitting over said tank, a film holder removably fitted into said tank and including an elongated top bar, a filler neck on said panel adjacent one end thereof, and coacting baffle devices on said panel and bar for obstructing the entrance of light into the tank through the filler neck comprising a pair of transverse cleats on the bottom of said panel upon opposite sides of said filler neck, respectively, and a pair of spaced-apart angular cleats on top of said bar extending along the sides thereof and crosswise of the bar in surrounding relation to the cleats first mentioned and being spaced apart to permit the developer to pass between the same.

ANTHONY M. JANKOSKI.